United States Patent
Strohl

(10) Patent No.: US 6,308,159 B1
(45) Date of Patent: Oct. 23, 2001

(54) METHOD AND APPARATUS FOR TICKET TURN-BACK CAPABILITY

(75) Inventor: Glenn E. Strohl, Edenton, NC (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/209,461

(22) Filed: Dec. 11, 1998

(51) Int. Cl.[7] ................................................... G06F 17/60
(52) U.S. Cl. ........................................................... 705/5
(58) Field of Search ....................... 705/1, 5, 37; 380/24, 380/23; 345/467

(56) References Cited

U.S. PATENT DOCUMENTS

| | | | | |
|---|---|---|---|---|
| 5,333,257 | * | 7/1994 | Merrill et al. | 345/467 |
| 5,621,797 | * | 4/1997 | Rosen | 380/24 |
| 5,724,518 | * | 3/1998 | Helbling | 705/1 |
| 5,754,654 | * | 5/1998 | Hiroya et al. | 380/24 |
| 5,930,761 | * | 7/1999 | O'Toole | 705/5 |
| 6,058,379 | * | 5/2000 | Odom et al. | 705/37 |
| 6,067,532 | * | 5/2000 | Gebb | 705/37 |

FOREIGN PATENT DOCUMENTS

WO 98/10361 * 3/1998 (WO) ............................. G06F/17/60

OTHER PUBLICATIONS

"Winning partnership helps speed up resale of tickets and raises cash for charity." Business Wire (Jun. 28, 1999) p. 1496.*

* cited by examiner

Primary Examiner—Eric W. Stamber
Assistant Examiner—John Leonard Young

(57) ABSTRACT

A method for recycling tickets on a network, entails receiving from a ticket holder a request to recycle a ticket, receiving from the ticket holder, in response to a prompt, information about the ticket, marking in a database the ticket as available for recycling, and recycling the

15 Claims, 3 Drawing Sheets

METHOD AND APPARATUS FOR TICKET TURN-BACK CAPABILITY

The present invention relates to network transactions. In particular, the present invention relates to using network capabilities to donate or return products.

BACKGROUND OF THE INVENTION

For certain kinds of events, such as college and professional basketball, hockey, and baseball, season ticket holders purchase their tickets in advance of the season. Many of these ticket holders do not attend all games, but buy the season tickets nevertheless. For the unused tickets, the ticket holder typically absorbs the cost of those tickets. This practice obviously results in money lost for the ticket holder. Additionally, this practice denies others the opportunity to enjoy the sporting events because the seats are left unfilled by others who would like to attend the event. For the various teams who are playing in the event, they are denied the support of fans, and the home teams and stadium owners are often embarrassed by an abundance of empty seats.

There are a variety of ways in existence to deal with this problem, some legal, some not. For example, the ticket holder can stand outside the stadium some time before the game and attempt to sell their unused tickets to fans who would like to attend the game. This technique, however, necessitates that the ticket holder actually show up outside the stadium, thereby spending valuable time and energy in an endeavor that may bear little fruit.

Another known way of dealing with the problem of unused tickets is to give the tickets to another individual, commonly referred to as a scalper who then stands outside the stadium prior to the game in an effort to sell the ticket, typically at a substantially marked-up price. This method has several drawbacks, not the least of which is the fact that this practice is illegal in many jurisdictions and can result in jail time for the ticket holder. Unlawfulness aside, the scalper will typically charge a commission, thereby resulting in some kind of transaction cost to the ticket holder.

In light of the above discussion, it would be advantageous to develop a system that would reduce the monetary loss to the ticket holder and minimize efforts needed for the ticket holder to recoup the ticket's cost.

SUMMARY OF THE INVENTION

To alleviate the problems inherent in the prior art, a system and method are disclosed for recycling tickets that a ticket holder does not intend to use.

To recycle the tickets, a request from a ticket holder is received over a network to recycle a ticket. Also received from the ticket holder is information about the ticket. A database then marks the ticket as available for resale and the ticket is resold.

DETAILED DESCRIPTION

To increase flexibility for ticket holders while decreasing monetary losses suffered by ticket holders, a system and method are introduced for recycling tickets.

Figure 1:
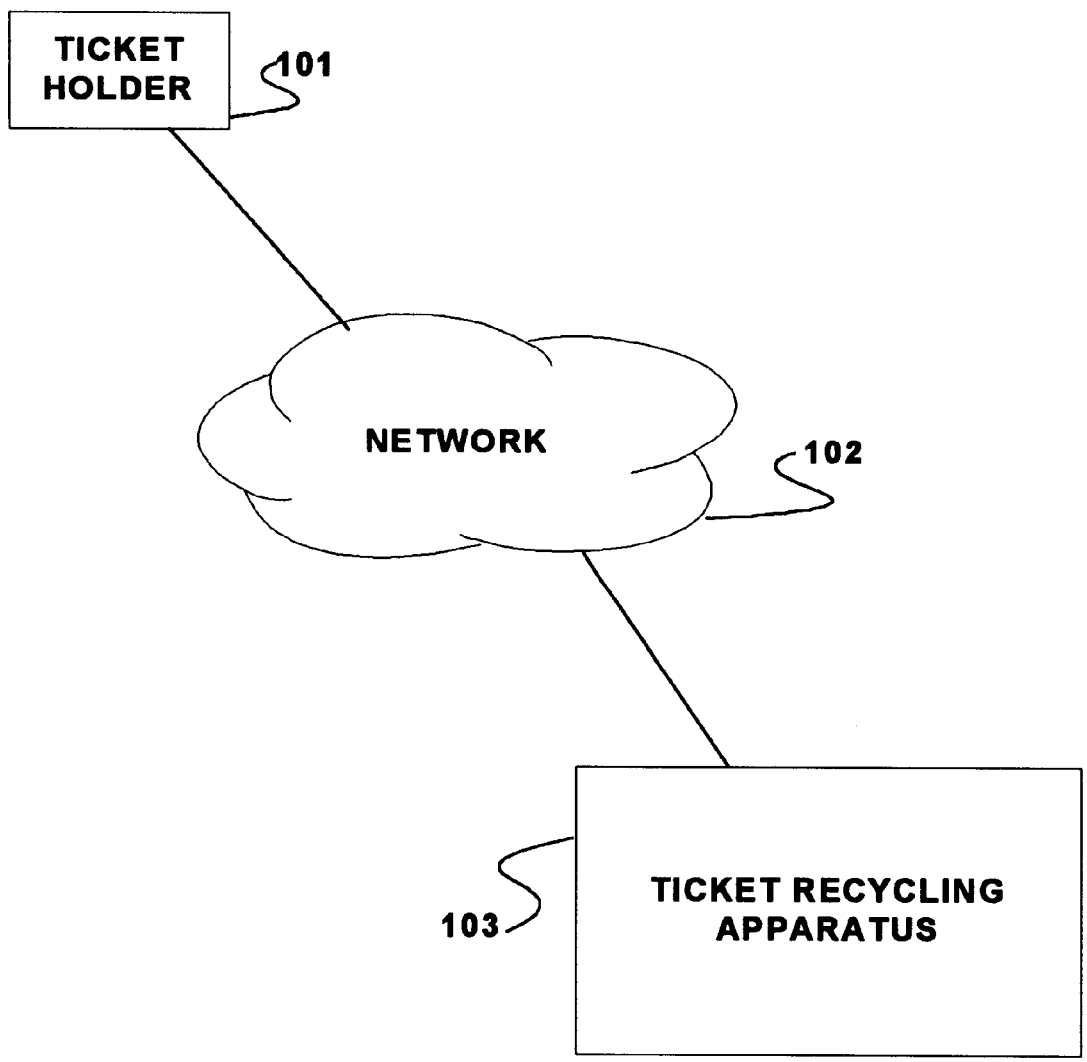
FIG. 1 is a system overview of an embodiment of the present invention.

FIG. 1 is a system overview of an embodiment of the present invention. Assume as an example, but not the only example, that ticket holder 101 paid full price for seasons tickets to watch a football game at a certain stadium. Also assume that the ticket holder has a job that places large constraints on the ticket holder's time and flexibility. Because of these constraints, ticket holder 101 must miss several games, but does not want to lose the money paid for the tickets. In this example, ticket holder 101, through the use of some network-connection device, can connect to ticket-recycling apparatus 103 via network 102 by calling a toll-free number. In this example, ticket-recycling apparatus 103 can prompt ticket holder 101 for some kind of identification. That identification can take the form of, for example, a ticket serial number, or a ticket-holder personal identification number (PIN). Once ticket holder 101 is identified by, in this example, the PIN, ticket-recycling apparatus 103 can prompt the ticket holder 101 for a variety of information about the ticket. For example, but not the only example, ticket-recycling apparatus 103 can prompt ticket holder 101 for information regarding the date of the game for which the ticket refers, and the seat, row, and section numbers for the ticket.

In this example, ticket-holder 101 can respond with dual-tone multi-frequency (DTMF) signals, or can respond with voice signals. If, however, the network is a packet network like the Internet, user 101 and ticket-recycling apparatus 103 can communicate by exchanging packet data. User 101, for example, can connect to ticket-recycling apparatus's 103 web site and use a standard web browser, or some other kind of graphical-user interface, to send and receive information.

After receiving sufficient information from user 101, ticket-recycling apparatus 103 can enter the information, or some portion of it into a data base, thereby marking the tickets as available for resale or reuse. Alternatively, ticket-recycling apparatus 103 can enter into the database some information derived from the information received from user 101, thereby marking the tickets as available for resale or reuse. The tickets can then be resold or donated by the ticket-recycling system, and used by others to attend the game.

Additionally, ticket-recycling apparatus 103 can create a customer accounting for the value of the returned tickets. Ticket holder 101 can then either be given credit for the ticket, in which case a receipt or voucher can be issued to ticket holder 101 for the value of the ticket, or ticket holder 101 can be reimbursed in full or in part for the cost of the ticket. In the case of tax-exempt institutions such as universities or museums, the recycled ticket can be treated as a charitable donation, and so ticket holder 101 can be issued a receipt by the institution so that the cost of the recycled ticket to ticket holder 101 can be taken as a tax deduction. Likewise, for a commercial enterprise such as a sports team, the cost of the ticket or some portion thereof, if resold, can be directed to a charity, and so ticket holder 101 can deduct this cost from his taxes as a charitable donation.

For the purpose of the present invention, to recycle a ticket means to resell or donate a previously-acquired ticket.

Figure 2:
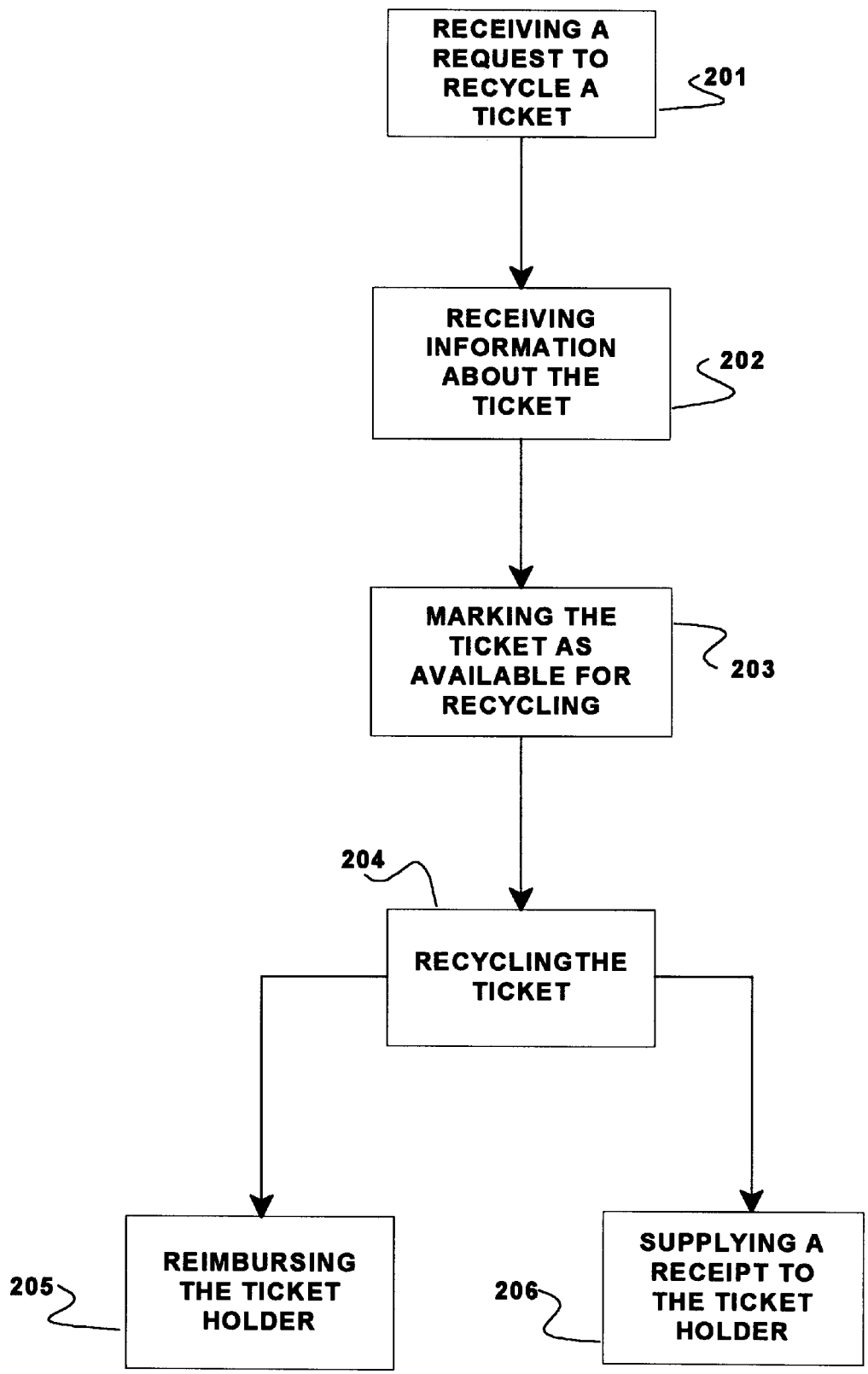
FIG. 2 is a flow chart of a method of performing an embodiment of the present invention.

FIG. 2 is a flow chart of a method embodiment of the present invention. Note that the flow chart is not meant to imply a fixed order; the steps in the method can be performed in any way that is practicable. At step 201 a request is received to recycle a ticket. At step 202, certain information about the ticket is received from the ticket holder. This information can include, but is not limited to, at least one of the following: the date of the event, the serial number (or other identifier of the ticket), a PIN, the section, row and seat number to which the ticket applies.

The way the information is received in step 202 depends on the type of network used for the transaction. For example, if the transaction occurs using a telephone over the public switched telephone network (PSTN), the information can be received in the form of DTMF signals, or can be voice signals, or some combination of the two. If the transaction occurs over some packet-switched network like the Internet, then the information can be received in the form of digital data packets. Additionally, a standard web browser, or other types of graphical-user-interfaces, can be used to obtain the information.

At step 203, the ticket is marked as available for recycling. To do this, the ticket-recycling service provider can use and/or maintain a ticket database that stores ticket information about all tickets, sold tickets, or recycled tickets, or some combination of the three. After step 201 is performed, and after sufficient information about the ticket at issue is received to identify the ticket, information can be added to the ticket database that tags that ticket either as recycled, as available for recycling, or both.

At step 204 the ticket is recycled. The ticket can be recycled in any known way, such as, but not limited to, reselling the ticket at the box office, reselling the ticket over the telephone, and reselling the ticket over the Internet. The ticket can also be donated to an individual or organization, again, in any known way. Then, at step 205, the ticket recycler can reimburse the ticket holder for at least some amount of the ticket price. In one embodiment of the present invention, the ticket holder is reimbursed only if the ticket is resold. In another embodiment of the present invention, the ticket holder is reimbursed at least some amount of the cost of the ticket even if the ticket is not resold. Additionally, or alternatively, at step 206, a receipt can be supplied to the ticket displaying information about the recycling transaction. For example, at step 206, a receipt that displays the price of the ticket, or the portion of the price that can be deducted from taxes, can be sent to the ticket holder.

Table 1 is an example of a ticket database. In this example, the first column contains the ticket identification number. In this example, this number is used to identify a particular ticket.

The second column contains the status of the ticket. The first ticket, identified by ticket identification number ABC 123 has been recycled and sold at a price of $35. The second ticket, identified by ticket identification number ABS 125 has been recycled but not resold. The third ticket, identified by ticket identification number ABC 345 has been sold once at a price of $10, but not recycled. If, as is the case with the second ticket, the table shows that the ticket has been recycled but not resold, then recycling service knows that this ticket is available for resale, in this case at a price of $25.

TABLE 1

| TICKET IDENTIFICATION NO. | STATUS OF TICKET | PRICE OF TICKET |
|---|---|---|
| ABC 123 | RECYCLED AND RESOLD | $35 |
| ABS 125 | RECYCLED AND NOT RESOLD | $25 |
| ABC 345 | SOLD | $10 |

For the purpose of the present invention, the word "resold," and all grammatically-related words, means sold a second time to a consumer. Additionally, for the purpose of the present invention, the phrase "ticket holder" means a consumer who, at least initially, decided to acquire the ticket.

Figure 3:
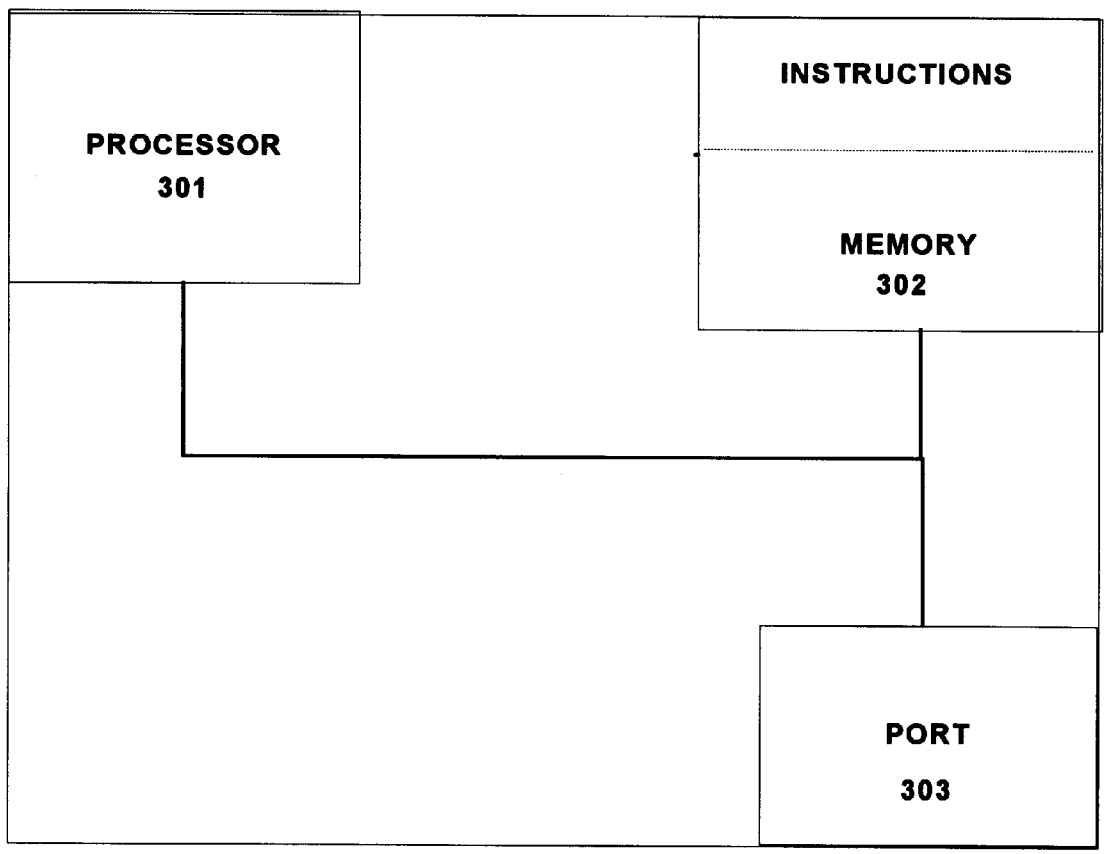
FIG. 3 is a block diagram of an apparatus embodiment of the present invention.

FIG. 3 is a block diagram of an apparatus according to an embodiment of the present invention. In one embodiment of the present invention, processor 301 is coupled to memory 302 and port 303, and memory 302 stores instructions adapted to be executed by processor to perform a method embodiment of the present invention. For example, but not the only example, memory 302 stores instructions adapted to be executed by processor 301 to receive from a ticket holder a request to recycle a ticket, receive from the ticket holder information about the ticket, mark in a database the ticket as available for recycling, and then recycling the ticket.

For the purposes of this application, memory includes any medium capable of storing instructions adapted to be executed by a processor. Some examples of such media include, but are not limited to, RAM, floppy disks, CDROM, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for recycling tickets on a network, comprising:
   (a) receiving from a ticket holder a request to recycle a ticket;
   (b) receiving from the ticket holder information about the ticket and a preference as to how the ticket is to be recycled wherein the preference includes an instruction to donate the ticket to charity;
   (c) marking in a ticket database that the ticket is available for recycling; and
   (d) recycling the ticket.

2. The method of claim 1, further comprising:
   (a) reimbursing the ticket holder some amount of money for the ticket.

3. The method of claim 1, further comprising:
   (a) supplying the ticket holder with a receipt for the recycled ticket, wherein the receipt includes information about the cost of the ticket.

4. The method of claim 1, wherein the received information includes a ticket identifier.

5. The method of claim 1, wherein the received information includes a seat identifier.

6. An apparatus for recycling tickets on a network, comprising:
   (a) a processor;
   (b) a port;
   (c) a memory storing instructions adapted to be executed by said processor to
      1. receive from a ticket holder a request to recycle a ticket;

2. receive from the ticket holder information about the ticket, the information including a preference as to how the ticket is to be recycled wherein the preference includes an instruction to donate the ticket to charity;

3. mark in a database the ticket as available for recycling; and 4. recycle the ticket.

7. The apparatus of claim 6, said memory storing further instructions adapted to be executed by said processor to:

(a) reimburse the ticket holder some amount of money for the ticket.

8. The apparatus of claim 6, said memory storing further instructions adapted to be executed by said processor to:

(a) supply the ticket holder with a receipt for the recycled ticket, wherein the receipt includes information about the cost of the ticket.

9. The apparatus of claim 6, wherein the received information includes a ticket identifier.

10. The apparatus of claim 6, wherein the received information includes a seat identifier.

11. A medium storing instructions adapted to be executed by a processor to:

(a) receive from a ticket holder a request to recycle a ticket;

(b) receive from the ticket holder information about the ticket, the information including a preference as to how the ticket is to be recycled wherein the preference includes an instruction to donate the ticket to charity;

(c) mark in a database the ticket as available for recycling; and (d) recycle the ticket.

12. The medium of claim 11, said medium storing further instructions adapted to be executed by said processor to:

(a) reimburse the ticket holder some amount of money for the ticket.

13. The medium of claim 11, said memory storing further instructions adapted to be executed by said processor to:

(e) supply the ticket holder with a receipt for the recycled ticket, wherein the receipt includes information about the cost of the ticket.

14. The medium of claim 11, wherein the received information includes a ticket identifier.

15. The medium of claim 11, wherein the received information includes a seat identifier.

* * * * *

UNITED STATES PATENT AND TRADEMARK OFFICE
CERTIFICATE OF CORRECTION

PATENT NO. : 6,308,159 B1
DATED : October 23, 2001
INVENTOR(S) : Glenn A. Strohl Page 1 of 1

It is certified that error appears in the above-identified patent and that said Letters Patent is hereby corrected as shown below:

<u>Title page,</u>
ABSTRACT, line 5, after "the" insert -- ticket. --.

Signed and Sealed this

Ninth Day of April, 2002

Attest:

JAMES E. ROGAN
*Attesting Officer*   *Director of the United States Patent and Trademark Office*